United States Patent Office 2,705,208
Patented Mar. 29, 1955

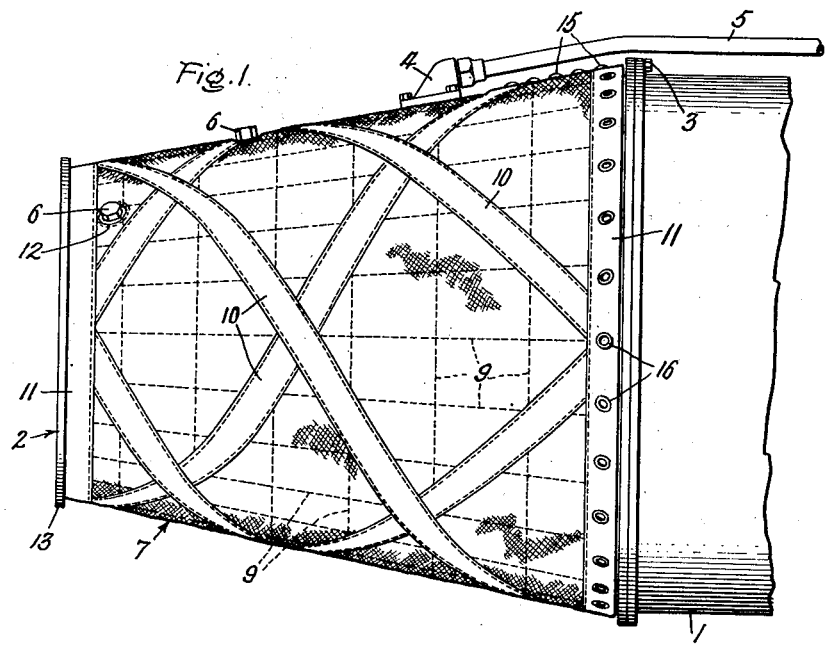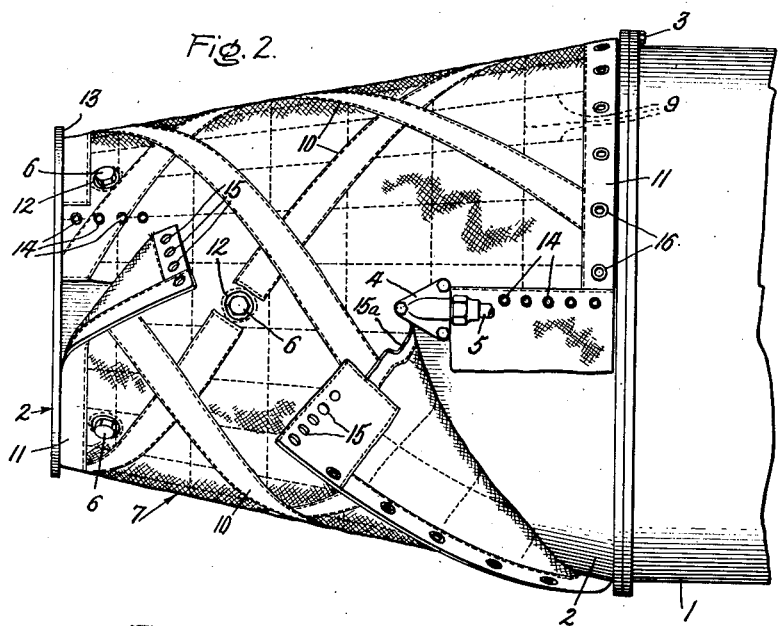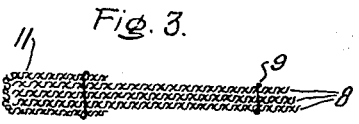

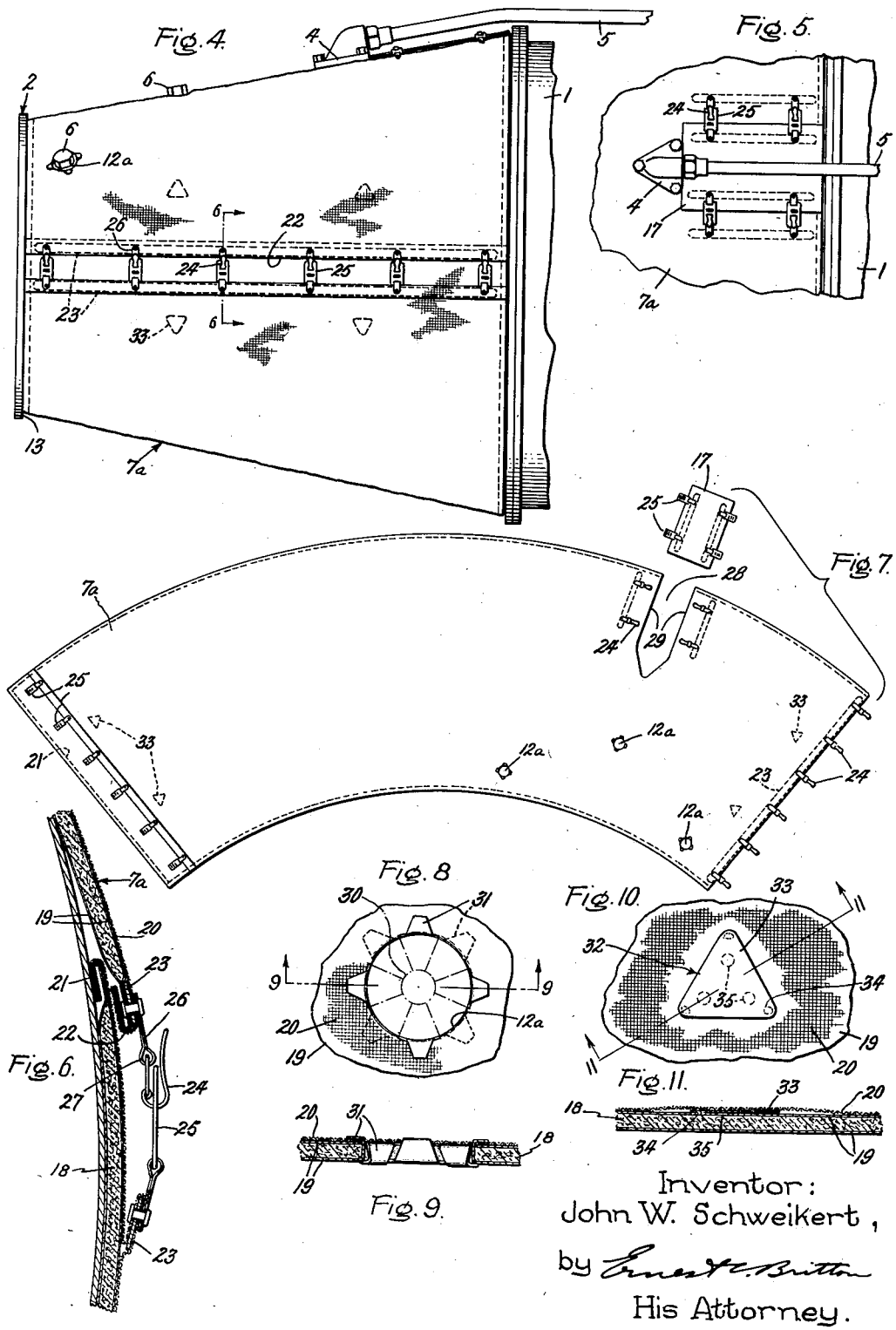

2,705,208

THERMAL INSULATION BLANKET

John W. Schweikert, Newport, Ky., assignor to General Electric Company, a corporation of New York Application April 30, 1951, Serial No. 223,713

4 Claims. (Cl. 154—44)

This invention relates to thermal insulation and particularly to an insulating cover for an object which is subjected to elevated temperatures and to mechanical vibration.

In connection with the operation of thermal power plants of the type which include the use of a gas turbine, it is desirable to provide means wherever possible for preventing an expenditure of thermal energy without doing useful work. A thermal power plant of the type described may comprise a compressor, a combustion system, and a turbine connected in series flow relation with the turbine and compressor mechanically connected so that at least a portion of the power developed by the turbine serves to drive the compressor. The structural details of such a power plant are not essential to an understanding of the present invention, and are described with greater particularity in U. S. Patent No. 2,432,359—Streid and Patent No. 2,479,573—Howard, assigned to the assignee of this application. In power plants of the type described, the thermal efficiency of the power plant increases as a function of the turbine inlet temperature. Accordingly, it is customary to operate the combustion system and turbine portions of such power plants at the highest temperature level commensurate with safe operation and with the desired life expectancy of critical parts which are subjected to such elevated temperatures. In power plants of the type described, the turbine inlet temperature may be of the order of 2000° F., and the turbine exhaust temperature may be of the order of 1500° F. In power plants of the type described in the above-mentioned Streid and Howard patents, the motive fluid discharged from the turbine is usually discharged at a relatively high energy and temperature level. It is, therefore, available for doing useful work such as, for example, propelling an aircraft. As already indicated, it is desirable in the interest of efficiency to provide means for preventing a loss or expenditure of such useful energy without doing useful work. Therefore, it will be apparent to those skilled in the art that it is highly desirable to provide some sort of thermal insulation to prevent or minimize such a loss or expenditure of energy.

In power plants of the type described, it is customary and desirable to provide exhaust conduit means for conducting hot motive fluid discharged from the turbine to another convenient location where such fluid may be conveniently utilized or discharged to the atmosphere. As previously indicated, such conduit means must be suitable for handling fluid at elevated temperatures at least of the order of 1500° F. and, as is the case with most machinery having moving parts, the apparatus including such a conduit means may be subjected to mechanical vibration or vibration resulting from aerodynamic disturbances.

Accordingly, it has been customary in the past to provide some sort of covering for such conduit means. Such a covering was made of a thermal insulating material and was formerly constructed in such a way that the complete covering included at least two separate halves. Each of said halves was provided with a plurality of "hook" type fastening means secured to said covering on axially extending edge portions thereof and the respective halves were secured in place by means of wire interlacing connected to said "hooks" in the manner disclosed in Patent 2,504,421—Johnson et al. Such an arrangement has not been entirely satisfactory in view of the fact that the services of at least two men were required to assemble an insulation covering of this type, considerable time was required to secure the wire interlacing in place, and also because the wire lacing and hook arrangement was inflexible and tended to pull away from the insulating material when the assembly was subjected to the effects of thermal expansion.

Accordingly, it is an object of the invention to provide a novel and improved insulation blanket.

Another object is in the provision of an improved insulation blanket of one piece construction, which is of flexible construction and is sufficiently elastic so as to fit snugly around an object which is subjected to elevated temperatures.

Another object is to provide a novel and improved thermal insulation blanket of one piece construction adapted to fit snugly around an object, which blanket is removable and adapted to fit around projections which extend outwardly from said object without removal of said projection, and which can be installed in a minimum amount of time and which requires the services of only one man for the installation of said blanket on said object.

Other objects and advantages will be apparent from the following description taken in connection with the accompanying drawings in which Fig. 1 is an elevation view showing an insulation blanket in accordance with the invention installed on an exhaust conduit for a gas turbine type of power plant; Fig. 2 is a plan view of the arrangement shown in Fig. 1 and is taken in the direction looking downward on Fig. 1 showing the blanket in final assembly or initial disassembly position; Fig. 3 is a fragmentary cross-sectional view showing the construction of the edge of the blanket; Fig. 4 is an elevation view of a figure similar to Fig. 1 showing another embodiment of the invention; Fig. 5 is a partial plan view of Fig. 4; Fig. 6 is a cross-sectional view on line 6—6 of Fig. 4; Fig. 7 is a developed view of the insulation blanket shown in Figs. 4–6; Fig. 8 is a detail view showing the construction in the region of an opening in the blanket shown in Figs. 4–6; Fig. 9 is a sectional view taken on line 9—9 of Fig. 8; Fig. 10 is a detail view showing the construction in the region of a breather; and Fig. 11 is a sectional view taken on line 11—11 of Fig. 10.

Referring now to Figs. 1 and 2, a turbine casing 1 encloses a turbine nozzle (not shown) and a turbine wheel (not shown). An exhaust conduit 2 is connected to the turbine casing by any convenient securing means, for example, by threaded fastenings 3. Exhaust conduit 2 may comprise a substantially conical outer wall portion forming one boundary of a fluid passageway for receiving motive fluid discharged from the turbine and another coaxial inner wall portion forming a surface of revolution cooperating with and spaced from the outer wall portion to form an annular fluid passageway. The inner coaxial wall portion (not shown) defines a substantially enclosed central chamber adjacent the discharge side of the turbine wheel. An exhaust conduit of this type is described with greater particularity in the above-mentioned Streid patent. In gas turbine types of power plants where the turbine operating temperatures may be of the order of 1500–2000° F., it is often desirable to provide means for supplying cooling fluid to the rear face of the turbine wheel. In such cases, additional means which may include another conduit (not shown) are provided for establishing communication with the above-mentioned central chamber and the outer periphery of exhaust conduit 2. Such additional conduit means are also arranged to communicate with a fitting member 4 secured to the outer surface of exhaust conduit 2. The fitting member 4 is adapted to be connected to a conduit 5 which is connected to a suitable source (not shown) of cooling fluid. For example, conduit 5 may be connected to the compressor portion (not shown) of the power plant in cases where it may be desirable to utilize air under pressure as a cooling means.

It is often desirable to provide means whereby pressure and temperature measurements can be taken to determine the condition of the motive fluid discharged from the turbine into exhaust conduit 2. In such cases, it is customary to provide bosses at desired locations on the outer periphery of exhaust conduit 2 for securing and admitting pressure or temperature probes into the fluid passageway formed by exhaust conduit 2. These bosses project outwardly from the outer wall of exhaust conduit 2 and are normally plugged by means of threaded fastenings 6 during periods when no instrumentation is required.

According to one embodiment of my invention, thermal insulating blanket 7 is of one piece construction, and is adapted to fit snugly around the outer wall portion of exhaust conduit 2. Excellent results have been obtained by constructing blanket 7 of a plurality of layers of thermal insulating material, such as glass cloth, and stitching individual layers 8 together in quilted fashion as is particularly shown at 9 in Figs. 2 and 3. In order to reinforce the quilted blanket, a plurality of tapes 10 are stitched thereto. Tapes 10 may also be of glass cloth material and they are arranged with equal spacing around the periphery of the blanket and are disposed diagonally with respect to the edge portions thereof as illustrated in Figs. 1 and 2. To prevent fraying of said edge portions, similar tapes 11 are provided at each edge portion of the quilted blanket and stitched thereto in a manner which will be apparent from Fig. 3.

I have found that an insulating blanket constructed in this manner possesses sufficient flexibility and elasticity so that it will fit snugly around an exhaust conduit 2 similar to a stocking. Accordingly, I construct my one piece blanket to fit the external contour of exhaust conduit 2. As already indicated, exhaust conduit 2 is substantially conical so that the opening formed by one edge portion of my blanket is somewhat larger than the corresponding opening formed by the other edge portion. By means of this construction and by providing a plurality of openings 12 which are spaced so as to correspond with the spacing of the bosses, the blanket can be slipped easily over the smaller end portion of exhaust conduit 2 and over the outwardly projecting fastenings 6.

Ordinarily, exhaust conduit 2 will be provided with a flange portion 13 in order to facilitate connection to another conduit portion (not shown) or to some other object. Since flange portion 13 extends outwardly beyond the substantially conical periphery of exhaust conduit 2, I provide an axially extending slit in my blanket to facilitate installation of the blanket over flange portion 13. In this way, the blanket can be slipped over flange 13 with comparative ease and the blanket will still fit snugly in the region closely adjacent flange 13. In order to secure the blanket firmly in place after it has been installed, I provide a plurality of securing means attached to the overlapping portions of the blanket or placket structure at the slit as will be apparent from Fig. 2. Conveniently, securing means 14, 15 may be of a well-known type such as snap fastenings. In order to permit installation and removal of the blanket from exhaust conduit 2 without removal of fitting 4 or conduit 5, I provide a similar slit and a placket structure or fly construction having securing means 14, 15 which extends in an axial direction from the opposite edge portion and is shown at the right-hand side of Fig. 2 and, in addition, an opening 15a is provided in the blanket at the left-hand extremity of the latter slit portion. This opening is shaped to conform to the shape of fitting 4 in the region where fitting 4 is secured to exhaust conduit 2.

In order to prevent any tendency for blanket 7 to slip toward the smaller end of exhaust conduit 2, I provide means at the edge portion of the blanket which fits adjacent flanges 3 whereby the blanket can be connected to flanges 3. Such securing means may comprise a plurality of eyelets 16 attached to the right-hand end portion of blanket 7. Eyelet 16 may engage a plurality of hooks (not shown) which are in turn secured to flanges 3, or, the blanket may be secured in place by wire interlacing passing through eyelet 16 and secured to either the turbine casing 1 or the flanges 3.

Installation of my improved blanket on exhaust conduit 2 is accomplished by slipping the blanket 7 over the smaller flange 13 of exhaust conduit 2 with openings 12 aligned with the bosses so that fastenings 6 will project through said openings when the blanket is pulled into place. When the blanket is in the proper place with respect to exhaust conduit 2, that is, with fastenings 6 projecting through openings 12, the slit adjacent flange 13 is closed by securing snap fasteners 14, 15. If desired, buckle and loop type fasteners as shown in Figs. 4–7 may be used. The slit portion which is then adjacent flanges 3 is also closed by tucking one flap portion under conduit 5, then tucking the other flap portion also under conduit 5 and overlapping the first flap portion so that snap fastenings 14, 15 can be secured. After the fastenings have been secured, any tendency for blanket 7 to slip toward the smaller flange 13 is prevented by securing eyelets 16 over suitable hooks (not shown) or by means of wire interlacing in the manner previously described. It will be apparent that my improved blanket construction can be quickly and easily removed from exhaust conduit 2 by merely removing the wire interlacing or slipping eyelets 16 off any hooks that may have been provided, unfastening snap fastenings 14, 15, and pulling blanket 7 from exhaust conduit 2 over the smaller flange 13.

Another embodiment of the invention is illustrated in Figs. 4–11. Like parts bear the same designation as in the previous figures. In this modified embodiment of the invention, blanket 7a is substantially of one piece construction but is provided with a removable insert portion 17. The construction of blanket 7a differs from that previously described in that the blanket is constructed by enclosing a desired quantity of thermal insulating material 18, such as rock wool or glass wool, between spaced layers of metallic foil 19 as illustrated in Fig. 6. In order to provide additional strength and also to provide against accidental puncture of the thin outer layer of metallic foil, a layer of wire screen 20 is provided over the outer layer of metallic foil as is also indicated in Fig. 6. Blankets of this type which have been found to have excellent insulating properties and good durability were constructed with the foil layers made of either Monel or Inconel and the wire screen 20 made of Monel wire. At all edge portions of blanket 7a the ends of the foil layers 19 and of the wire screen 20 are looped over in the manner illustrated in Fig. 6 at 21 and, if desired, may be secured together by either spot or seam welding.

A developed view of blanket 7a is illustrated in Fig. 7. It will be apparent from the shape of this developed view that blanket 7a is also shaped to fit around the substantially conical outer surface of exhaust conduit 2. As will be apparent from an inspection of Figs. 6–7, one of the edge portions of blanket 7a is slightly longer than is necessary so that this edge portion will be overlapped by the mating edge portion when the blanket is installed to help seal a longitudinally extending seam 22 as shown in Fig. 4.

In order to secure the edge portions of the blanket together and thus hold the blanket firmly in place on the exhaust conduit 2, I prefer to employ a loop and buckle arrangement of the type often used for securing overshoes to the feet of a wearer. Referring now to Figs. 6 and 7, I provide a steel reinforcing strip 23 at or adjacent the edge portion of blanket 7a for carrying buckles 24 along one edge portion and loops 25 along the opposite edge portion. Buckles 24 and loops 25 are connected to reinforcing strips 23 by a supporting member 26 which is riveted to blanket 7a through reinforcing strips 23 as shown in Fig. 6. Supporting member 26 is bent over so as to form a loop 27 in order to obtain additional flexibility of alignment of the securing means. Buckle 24 or loop 25 is slipped over one end of member 26 and into loop 27 before member 26 is riveted to the blanket 7a and reinforcing strips 23.

To permit installation or removal of the blanket from exhaust conduit 2 without removing fitting 4 or conduit 5, a removable insert portion 17 is provided. Insert portion 17 is constructed in the same manner as blanket 7a and is provided with loops 25 secured thereto in the manner previously described. A portion of blanket 7a is cut away, as indicated at 28. Portions of the cutaway portion 28 form edge portions 29 which are parallel as will be apparent from the drawing. A plurality of buckles 24 are secured to said parallel edge portions 29 in the manner previously described and in spaced relation corresponding to the spacing of loops 24 which are secured to the insert portion 17. It will be apparent from an inspection of Fig. 7 that when insert portion 17 is secured to blanket 7a, a portion of cutaway portion 28 is covered leaving an opening conforming to the shape of fitting 4.

Referring now to Fig. 4, openings 12a are provided to fit around the outwardly projecting fastenings 6. Openings 12a are formed in a manner which will be better understood by reference to Figs. 8 and 9. First, an opening 30 which is smaller than the desired opening 12a is cut in blanket 7a. A plurality of notches are then cut in a direction generally outward from the center of the opening to form a plurality of flap portions 31 as indicated by the dot and dash lines of Fig. 8. Alternate flaps 31 are folded outwardly and are spot welded to the outer layer of mesh and the remaining alternate flaps are folded inwardly and spot welded to the inner layer of foil.

Referring now to Figs. 10 and 11, to prevent possible damage to the blanket from air which may become pressurized as a result of heating of the blanket, I provide a plurality of breathers 32 at convenient locations on blanket 7a. Breathers 32 comprise a plurality of openings 35 provided in the outer layer of foil 19 and an additional layer of foil 33 welded to layer 19 by welding at a number of locations 34. Openings 35 in cooperation with covering layer of foil 33 establish communication between the interior portion of the blanket and the atmosphere so that air can enter or leave the blanket as may be necessary through openings 35 and the space formed between foil layers 19 and 33 and between adjacent weld spots 34. In this way the blanket is permitted to "breathe" and at the same time cover layer 33 prevents insulating material 18 from escaping through openings 35.

To install my improved insulating blanket 7a, it is merely wrapped around exhaust cone 2 so that outwardly projecting fastenings 6 extend through openings 12a and fitting 4 extends through a portion of cutaway portion 28. The blanket is secured in place between flanges 3 and 13 merely by connecting buckles 24 through loops 25. It will now be apparent that this type of fastening means provides a considerable degree of flexibility. This is important because it is extremely desirable for a single assembly man to be able to install the blanket on an exhaust cone. By the use of buckle and loop type securing means, an assembly man can secure buckles 24 through one of the outermost openings in loop 25 so as to give a relatively loose fit of blanket 7a with respect to exhaust conduit 2 but which will still secure the blanket in place. Then, after checking to make sure that blanket 7a is properly aligned with respect to bosses 6, fitting 4 and the respective openings 12a or cutaway portion 28, the position of the blanket with respect to exhaust cone 2 can be readjusted if necessary. Once the proper alignment is obtained, the degree of tightness can be adjusted by merely inserting buckles 24 through a different opening in loop 25. Furthermore, it may be found that the degree of tightness with which blanket 7a fits around exhaust conduit 2 is entirely satisfactory when the exhaust conduit and blanket are in a cold condition but that the fit is too tight when the blanket and exhaust cone are subjected to elevated temperatures.

It will be apparent that the buckle type fastener possesses certain advantages in that it provides a positive means of fastening, even in a loose fit condition, without danger of coming loose due to mechanical vibration or because of fluid flow around the blanket at relatively high velocities and it provides a broad range of adjustment which may be required because of thermal expansion of parts enclosed by the blanket.

After the main portion of the blanket has been installed in place, insert 17 is slipped under conduit 5 and secured to the main portion of the blanket by means of buckles and loops 24, 25. It will also be apparent that considerable flexibility is provided by the use of buckles and loops as fastening means.

Disassembly is very easy, it being merely necessary to disconnect buckles and loops 24, 25 to remove insert portion 17 and at seam 22 and then the entire blanket assembly can be lifted from the exhaust cone 2.

It has been found that blankets of the type described in connection with Figs. 4–11 possess considerable stiffness as compared to blankets of the quilted type so that no additional securing means are required to prevent any tendency for the blanket to slip axially along exhaust conduit 2. However, this type of blanket does possess a sufficient amount of flexibility to permit the blanket to be wrapped around exhaust cone 2 and to be secured in place with considerable ease.

Thus it will be seen that my improved blanket constructions provide blankets of one piece construction which are adapted to fit snugly around an object, are easy to install and remove, and which can be removed from said object without disturbing external members which may be connected to said object.

While particular embodiments of the invention have been illustrated and described, it will be apparent to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. An insulation blanket comprising a layer of thermal insulating material, a pair of spaced layers of metal foil enclosing said layer of insulating material, one of said pair of spaced layers having at least one opening therein, an additional layer of metal foil covering said opening and fastened to said one of said pair of spaced layers at spaced locations adjacent said opening, and a protective metal screen covering the outer surface of one of said spaced layers, said additional layer being welded at a plurality of locations surrounding said opening to provide communication between the interior portion of the blanket and the atmosphere so that air can enter or leave the blanket through the space between the adjacent weld spots.

2. A thermal insulating blanket of one piece construction having opposed end portions and adapted to be wrapped around a jet engine and comprising a layer of flexible insulating material, a flexible metallic shield enclosing said layer, and a protective metallic screen on the outer surface of said shield, and means secured to each of said end portions for detachably securing said end portions together, said blanket having a removable insert portion, means comprising a buckle and loop structure secured to said blanket and to said insert portion for detachably securing said insert portion to the blanket, said blanket having a cutaway portion substantially closed by said insert portion and defining an opening for and fitting closely around a projection extending from said jet engine, breather openings positioned in the outer surface of said shield, said breather openings being formed by an additional metallic shield welded at a plurality of locations surrounding said breather openings so as to provide communication between the interior portion of the blanket and the atmosphere so that air can enter or leave the blanket through the space formed between the adjacent weld spots.

3. In an insulating blanket for an aircraft engine, inner and outer spaced layers of metallic foil, insulation material positioned between said spaced layers of metallic foil, said spaced layers of metallic foil being closed at their end portions by having the said ends juxtapositioned to each other and being bent over upon itself, means on said ends for releasably securing said end portions together, said blanket having a frusto-conical shape so as to cooperate with a flange portion on said engine to prevent slippage thereof, a protective metallic screen positioned on the outer surface of said outer layer of metallic foil, a removable insert portion, means for securing said insert portion to said blanket, said insert substantially closing a slot in said blanket, openings in the outer layer of metallic foil formed by an additional layer being welded at a plurality of locations surrounding said openings to provide communication between the interior portion of the blanket and the atmosphere so that air can enter or leave the blanket through the space between the adjacent weld spots.

4. In an insulating blanket, spaced layers of metallic foil, insulation material positioned between said layers of metallic foil, said spaced layers of metallic foil being closed at their end portions by having the said ends juxtapositioned to each other and being bent over upon itself, means on said ends for releasably securing said end portions together, and breather openings in one of said layers of metallic foil being formed by an additional layer being welded at a plurality of locations surrounding said openings to provide communication between the interior portion of the blanket and the atmosphere so that air can enter or leave the blanket through the space between the adjacent weld spots.

References Cited in the file of this patent

UNITED STATES PATENTS

| | | |
|---|---|---|
| 1,961,824 | Goldberg | June 5, 1934 |
| 2,137,756 | Gould et al. | Nov. 22, 1938 |
| 2,175,948 | Adams | Oct. 10, 1939 |
| 2,181,074 | Scott | Nov. 21, 1939 |
| 2,365,086 | Kamowski | Dec. 12, 1944 |
| 2,504,421 | Johnson et al. | Apr. 18, 1950 |
| 2,513,448 | Brunnzell | July 4, 1950 |
| 2,526,389 | Montefalco | Oct. 17, 1950 |
| 2,579,964 | Reynolds | Dec. 25, 1951 |

FOREIGN PATENTS

| | | |
|---|---|---|
| 482,809 | Great Britain | Apr. 5, 1938 |